United States Patent [19]
Blackmon et al.

[11] Patent Number: 5,493,392
[45] Date of Patent: Feb. 20, 1996

[54] DIGITAL IMAGE SYSTEM FOR DETERMINING RELATIVE POSITION AND MOTION OF IN-FLIGHT VEHICLES

[75] Inventors: James B. Blackmon, Brownsboro, Ala.; Kenneth W. Stone, Huntington Beach, Calif.

[73] Assignee: McDonnell Douglas Corporation, Huntington Beach, Calif.

[21] Appl. No.: 247,922

[22] Filed: May 23, 1994

Related U.S. Application Data

[63] Continuation of Ser. No. 999,768, Dec. 15, 1992, abandoned.

[51] Int. Cl.⁶ .............................. G01B 11/26; B64G 1/36
[52] U.S. Cl. .................. 356/139.03; 250/206.1; 250/206.2; 348/135; 356/141.5; 244/171
[58] Field of Search ............... 250/206.1, 206.2; 356/139.03, 141.5; 348/135; 244/171

[56] References Cited

U.S. PATENT DOCUMENTS

| | | | |
|---|---|---|---|
| 4,815,845 | 3/1989 | Colbaugh et al. | 356/153 |
| 4,834,531 | 5/1989 | Ward | 358/107 |
| 5,119,305 | 6/1992 | Ferro | 364/460 |
| 5,173,750 | 12/1992 | Laukaitis | 356/445 |
| 5,207,003 | 5/1993 | Yamada et al. | 356/153 |

*Primary Examiner*—Stephen C. Buczinski
*Attorney, Agent, or Firm*—D. E. Stout

[57] ABSTRACT

The system includes a reflector assembly mounted on a first one of a pair of spacecraft. The reflector assembly includes a mirror around which are positioned a mirror and retroreflectors. A light source mounted on the second spacecraft illuminates the assembly the reflections from which are directed into a radiometer which is also mounted on the second spacecraft. The mirror has a known curvature, and the known curvature in conjunction with the retroreflectors allow calculation of the position and motion parameters of the first spacecraft relative to the second.

10 Claims, 9 Drawing Sheets

DIGITAL IMAGE SYSTEM FOR DETERMINING RELATIVE POSITION AND MOTION OF IN-FLIGHT VEHICLES

This is a continuation of application Ser. No. 07/999,768, filed Dec. 15, 1992, now abandoned.

BACKGROUND OF THE INVENTION

The invention relates generally to systems for determining the position and motion of one vehicle (aircraft, spacecraft or ship) with respect to another and, more particularly, to optical systems for determining bearing, attitude, range and motion of one such vehicle relative to another at ranges on the order of kilometers but with an exceptionally high degree of accuracy at close range in order to facilitate link-up or rendezvous of the vehicles, such as for refueling or docking operations.

Refueling of aircraft in-flight requires that the refueling operation be accomplished within a certain minimum period of time since the receiving aircraft may be low on fuel and the pilots may be unduly fatigued from putting in excessively long flight time. In addition, range, motion and orientation of the aircraft relative to each other must typically be kept within certain maximal limits especially for safety reasons. Docking of two spacecraft in orbit additionally presents unique problems because orbital mechanics principles require a high degree of skill in docking spacecraft, and trial and error docking maneuvers would be costly in terms of time and propellant usage.

Docking maneuvers must be accomplished with a minimum of velocity and orientation changes to either or both spacecraft in order to avoid undue alteration of spacecraft orbit and attitude. Velocity changes imposed to bring the spacecraft together change the orbit and attitude in complex ways that can exceed manual pilot capability and make it extremely difficult to achieve docking in minimum time and with minimum propellant consumption, while satisfying docking constraints. These docking constraints are 1) assuring that effluent contamination from the attitude control thruster is kept below certain limits; 2) docking within a specified time period; 3) approaching along a specified flight path; 4) conforming to range/position and rate of change of position of target vehicle; 5) conforming to attitude and attitude rate of target vehicle; 6) acquiring and formatting data for use by navigation computers at commensurate rates and accuracies; 7) attaining and maintaining a desired degree of accuracy of target vehicle state vectors i.e., position, attitudes, rates, etc. so that the control system can meet the required impact or closure velocity, range, etc. These requirements are more stringent as the spacecraft near each other. Furthermore, docking ports are not necessarily easily observed by the target vehicle pilot, and, therefore, some means of observing and quantitatively evaluating and correcting docking range and attitude is required.

Since direct viewing of the refueling or docking operation by the pilot would not typically provide all the information required regarding vehicle position and motion with the degree of accuracy required, many prior art systems have been designed which are able to measure certain relevant position and motion parameters without requiring direct pilot observation of the refueling operation. Some prior art systems use optical systems to determine the location and range of the refueling boom and receiver aircraft relative to the tanker aircraft and to the boom. Examples of such a system are disclosed in U.S. Pat. Nos. 4,025,193 and 3,917,196 both to Pond et al. The Pond systems use an optical source on the tanker aircraft to transmit a light beam which is reflected by suitably positioned reflectors on the receiver aircraft and the boom. An optical sensor on the tanker aircraft determines azimuth, elevation and range of the receiver aircraft and the boom by focusing the reflected light onto an image dissector tube and feeds this information to a computer and to a cathode ray tube rectangular coordinate display. The range of the two aircraft is determined by comparison of the phase of the transmitted and reflected light beams. The range and relative positions are displayed as dots on a screen. A primary disadvantage with the Pond system is that determination of range by phase comparison limits range measurement to relatively short distances on the order of one-half of a wavelength.

A position and motion measuring system for in-flight vehicles is thus needed that has the capability of measuring position and motion over both close and moderate distances with a high degree of accuracy at close range. A position and motion measuring system is also needed that can provide such capabilities without utilizing moving parts that can wear, break or become misaligned because of vibration, shock or wear. In addition, a measuring system is needed that can provide such capabilities without being affected by light or radiation from extraneous sources or from extraneous reflections.

SUMMARY OF THE INVENTION

It is a principal object of the present invention to provide a position and motion determining system for in-flight vehicles which provides a desired degree of accuracy over both close and moderate ranges.

It is another object of the present invention to provide a position and motion determining system for in-flight vehicles which can provide the position and motion parameters at a high data rate, virtually in real time.

It is also another object of the present invention to provide a position and motion determining system for in-flight vehicles which has minimal moving parts for enhanced reliability and longevity.

It is still another object of the present invention to provide a position and motion determining system for inflight vehicles which is not significantly affected by extraneous signal inputs.

It is also an object of the present invention to provide a position and motion determining system which is relatively lightweight, rugged and compact.

Essentially, the system of the present invention utilizes apparatus mounted on both of two or more in-flight vehicles to determine the attitude, bearing, range and rate of change of these parameters of one vehicle relative to another. A video camera, configured so as to operate as a radiometer, mounted on one of the vehicles receives electromagnetic radiation (preferably, but not necessarily, in the visible light spectrum) from a reflector assembly mounted on the other vehicle. The video-radiometer is equipped with such lenses as are required to view the reflector assembly. The light from the assembly preferably originates from a light source on the first vehicle. The light is reflected from the assembly on the second vehicle and directed toward the video-radiometer. The assembly has a first and second set of light sources or retroreflectors which generally lie in the same plane which generally faces the video-radiometer. The light sources or retroreflectors direct light into the video-radiometer within a desired range of orientation angles of the assembly relative to the video-radiometer. The assembly also includes a reflector which has a curved portion which generally lies outside the plane. This unique positioning of the reflector outside the plane forms a triangular relationship between the reflector and the set of retroreflectors (or light sources) with one of the corners of each of the triangles positioned either toward or away from the video-radiometer. This positioning of the reflector also forms triangular relationships between the reflectors, the set of retroreflectors (or set of light sources) and the video-radiometer, and the triangles formed lie in planes which include the line formed by the direction of propagation of light from the assembly to the video-radiometer. These trigonometric relationships allow the calculation of range, bearing and pitch and yaw attitude by using certain trigonometric formulas. Frequent data samples also result in determination of changes in these parameters over time and thus determination of motion (rate of change of range, bearing and pitch and yaw attitude). The second set of light sources or retroreflectors is positioned in alignment with at least one of the light sources or retroreflectors of the first set resulting in asymmetry of the two sets. The asymmetry allows quick and easy determination of the roll position of the vehicles, and frequent data samples also result in determination of changes in roll parameters over time and thus determination of roll motion.

Basically, the system's determination of the desired position (and indirectly motion) parameters is based primarily upon the principle that a reflective surface must be perpendicular to the path of light from a given source in order for the light to reflect back to the point of origin. If the reflective surface has a known curvature, then the angle of the surface normal is also known as a function of the location on the mirror surface. For a light source to be seen by a video-radiometer (or camera) located at the same point, the reflected light would be perpendicular to the surface. Since the video-radiometer can view the light from the reflective surface and the curvature and the size of the reflective surface are known, the video-radiometer calibration constant (pixels per unit length) can be calculated from the video-radiometer lens zoom position and therefore the location of the light reflection point on the surface can be determined. Since the relationship between the distance from a reference location to the light reflection point on the mirror and the light reflection angle is known, the attitude of the mirror with respect to the line-of-sight to the video-radiometer is known. The bearing angle is determined by observing the reflected light position relative to a fixed axis established on the system. Similarly, if the light source is not collocated with the video-radiometer, then the surface normal of the reflective surface must bisect the angle formed by the light source. a point on the reflector surface and the video-radiometer, in order for the reflected light to be detected.

Either the video-radiometer could be fixed, with a lens having a sufficiently wide angle to meet field-of-view requirements, or the camera could be oriented (pan and tilt) as required to view the docking vehicle.

The video-radiometer measures the number of pixels between the images formed by the received light beams to determine the relative distance between the images and their relative configuration as viewed by the video-radiometer. This measurement in conjunction with the magnification of the received image is used to determine the actual distance between the reflection point on the reflector and the centroid of the retroreflectors. The video-radiometer has an electrical output which includes data relating to the separation of the light images and their configuration (distance from a fixed axis), and the electrical output data is fed to a computer which converts the data into digital form and stores it in its memory banks. The computer is also provided with a software program which utilizes the data in certain trigonometric formulas to produce the parameters of pitch, yaw, bearing and range. Repeated data inputs are received and utilized by the computer over a period of time to derive change in these parameters and thereby three dimensional relative motion of the vehicles.

A computer monitor is communicatingly connected to the computer and receives the parameter results therefrom. The monitor thus displays the parameter values and images on its viewing screen to provide sufficient position and motion information to the operator to facilitate the link up or docking operation.

The system preferably also includes a light source control. The video-radiometer takes an image of the assembly with the light source control on and takes an image of the assembly with the light source off and subtracts the image received with the control off from the image received with the control on. This results in elimination of extraneous sources of light and extraneous reflections from the received image. It is further required that the video-radiometer operate so as to exclude automatic gain control features normally employed on standard video cameras, so as to provide the appropriate preferably linear (or known) functional relationship between the incident light and the video output signal, and that appropriate camera iris settings and filters be used to insure that the camera operates within its dynamic range. Consequently, the radiometric measurements are not adversely affected by extraneous light from stars, the sun, reflections from lights on the target vehicle, etc. Thus, the consistency of the results obtained and the reliability of the system under adverse conditions is enhanced. Elimination of adverse effects from extraneous light sources can be further enhanced by using appropriate, restricted wave length bands for either or both of the light sources and filters in the video-radiometer.

DETAILED DESCRIPTION OF THE PREFERRED EMBODIMENT

Figure 1:
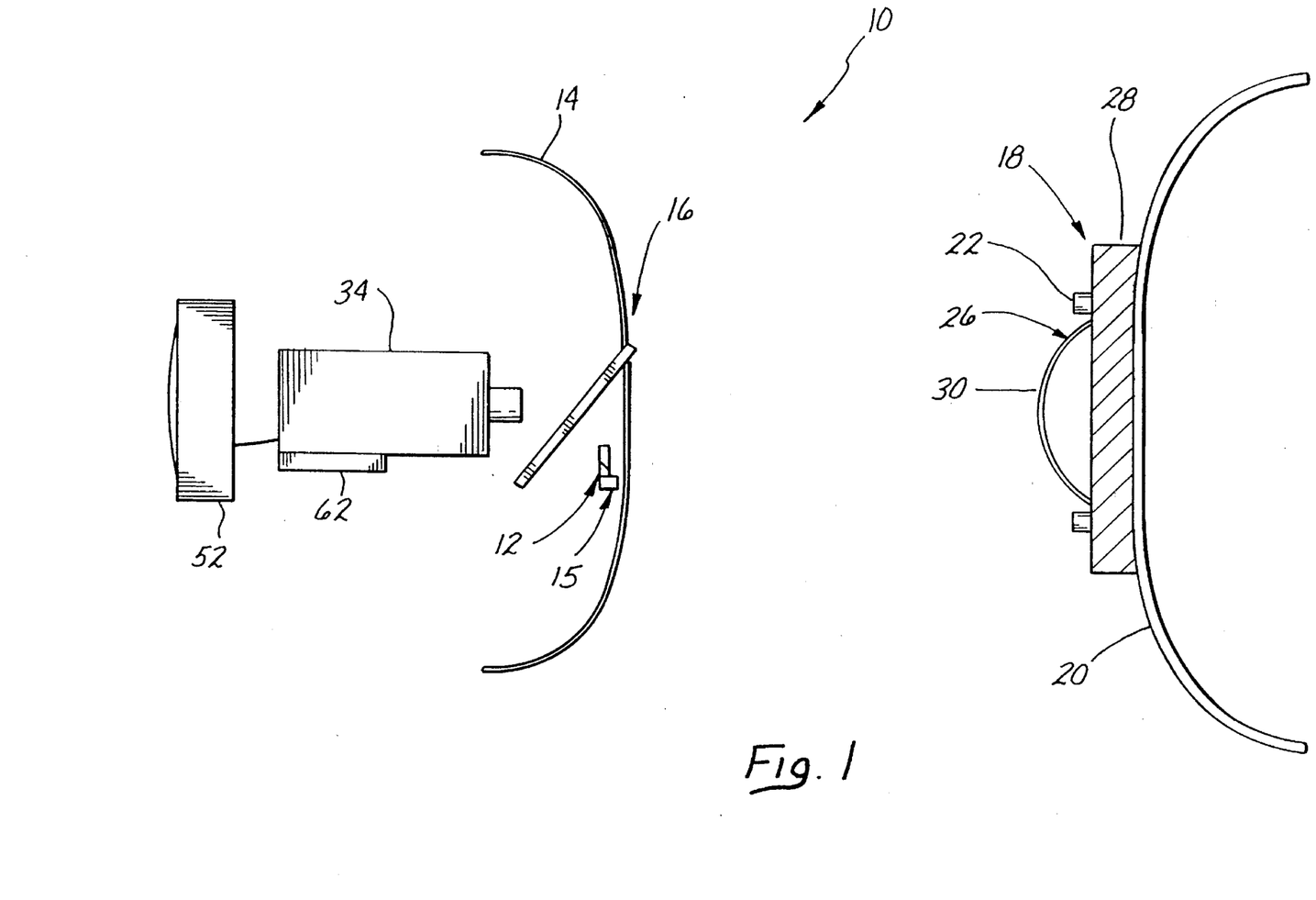
FIG. 1 is a diagrammatic view of the components of the system of the invention showing the video-radiometer, light source, monitor, reflector assembly and beam splitter mounted on opposing surface portions of the vehicles.
Figure 2:
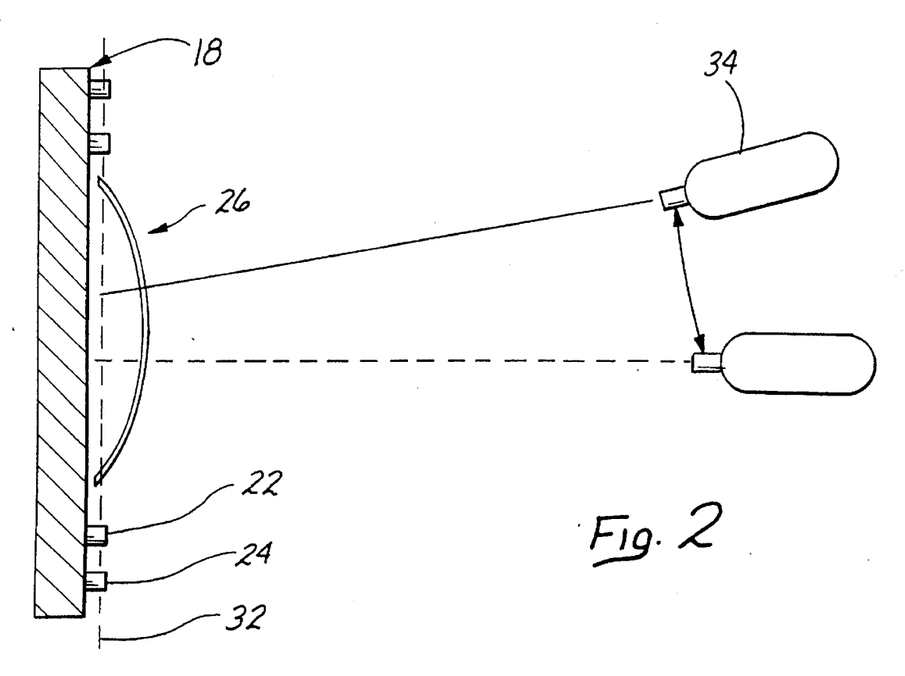
FIG. 2 is a diagrammatic side view of the reflector assembly of the system of the invention showing the relative positioning of the components thereof.
Figure 3:
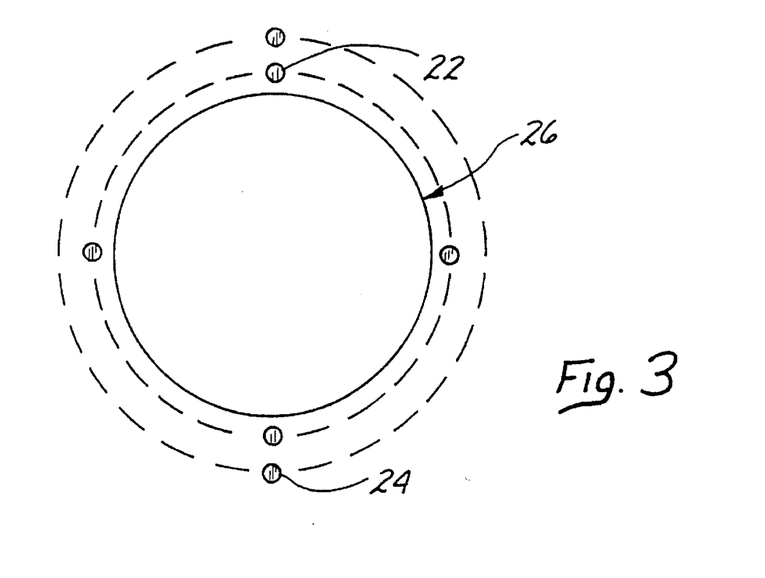
FIG. 3 is a diagrammatic front view of the reflector assembly of the system of the invention showing the positioning and configuration of the components thereof.

Referring now to the drawings, the image system of the present invention is generally designated by the numeral 10. The image system 10 preferably includes an electromagnetic radiation source 12 (preferably, but not necessarily, in the visible light spectrum, i.e., infrared light may be used or ultraviolet, for example) and a radiation source control 15 which are preferably mounted on a first aircraft or spacecraft 14. The source 12 of electromagnetic radiation (preferably in the visible light spectrum) preferably emits a radial beam of light which is directed to a beam splitter 16 which is also preferably mounted on the first aircraft 14. The splitter 16 deflects and directs the light to illuminate a reflector assembly (or light assembly) 18 which is preferably mounted on a second aircraft or spacecraft 20. The reflector assembly 18 preferably includes a first set of retroreflectors 22, a second set of retroreflectors 24, a reflector 26 and an assembly mount 28. The first and second set of retroreflectors 22 and 24 are preferably positioned around the periphery of the reflector 26, as shown in FIGS. 1, 2 and 3. The first set of retroreflectors 22 are preferably equidistantly spaced from each other around the reflector 26. Optionally, instead of being generally cube retroreflectors, the first set of retroreflectors 22 may be spherical balls, or one or more reflective strips or one or more circles. The reflector 26 is preferably simply a mirror having a curved surface portion 30 which may be ellipsoid, hyperboloid, spheroid, hemispherical, (or some combination of these curvatures) etc. The particular curvature of the mirror 26 may be selected to reflect light therefrom (at selected locations thereon) at either more or less acute angles (than at other locations thereon) in order to selectively alter the position and motion measuring capabilities and/or characteristics of the system 10, as will be described more fully hereinbelow.

Figure 5A:
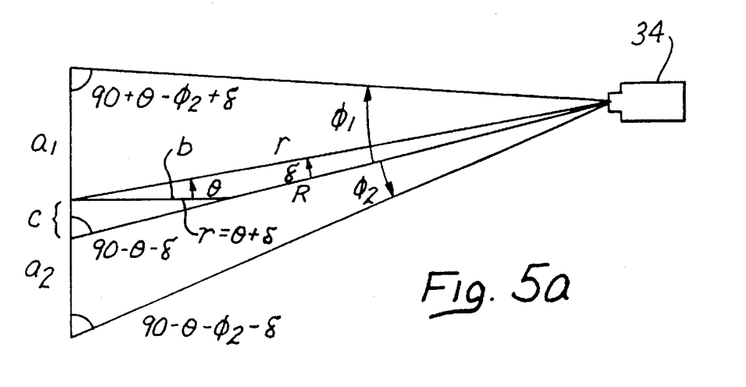
FIG. 5a is a diagram showing the triangular relationships and trigonometric relationships between the reflector assembly which has a hemispherical central reflector and the video-radiometer of the system of the invention for one particular angle of orientation of the reflector assembly relative to the radiometer.
Figure 5B:
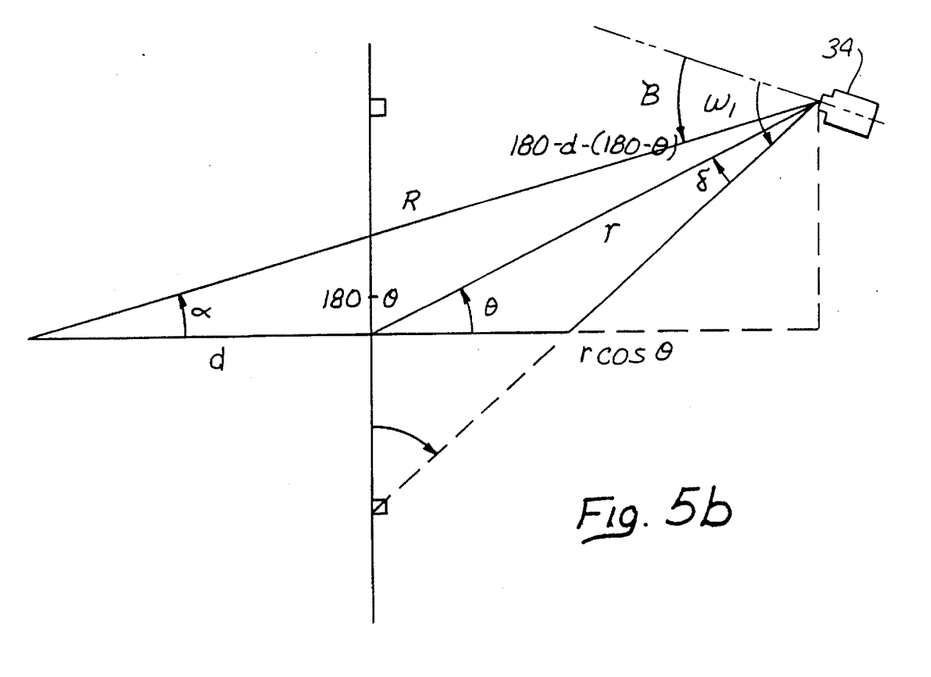
FIG. 5b is a diagram showing the triangular relationships and trigonometric relationships between the reflector assembly which has a hemispherical central reflector, target vehicle center of gravity, and the video-radiometer of the system of the invention for another particular angle of orientation of the reflector assembly relative to the radiometer.

The first set of retroreflectors 22 preferably generally lies in a plane 32, as shown in FIGS. 1, 2 and 3, and the curved portion 30 preferably generally, and at least partly, lies outside the plane 32. Thus, the various individual reflection points on the curved portion 30 in combination with the centroids of any two of the first set of retroreflectors 14 have a triangular relationship, as shown in FIGS. 5a and 5b. The triangular relationship depicted in FIGS. 5a and 5b is for a central mirror 30 which is a segment of a sphere. This relationship is important for determination of the position and motion parameters, as will be described more fully hereinbelow.

Figure 6:
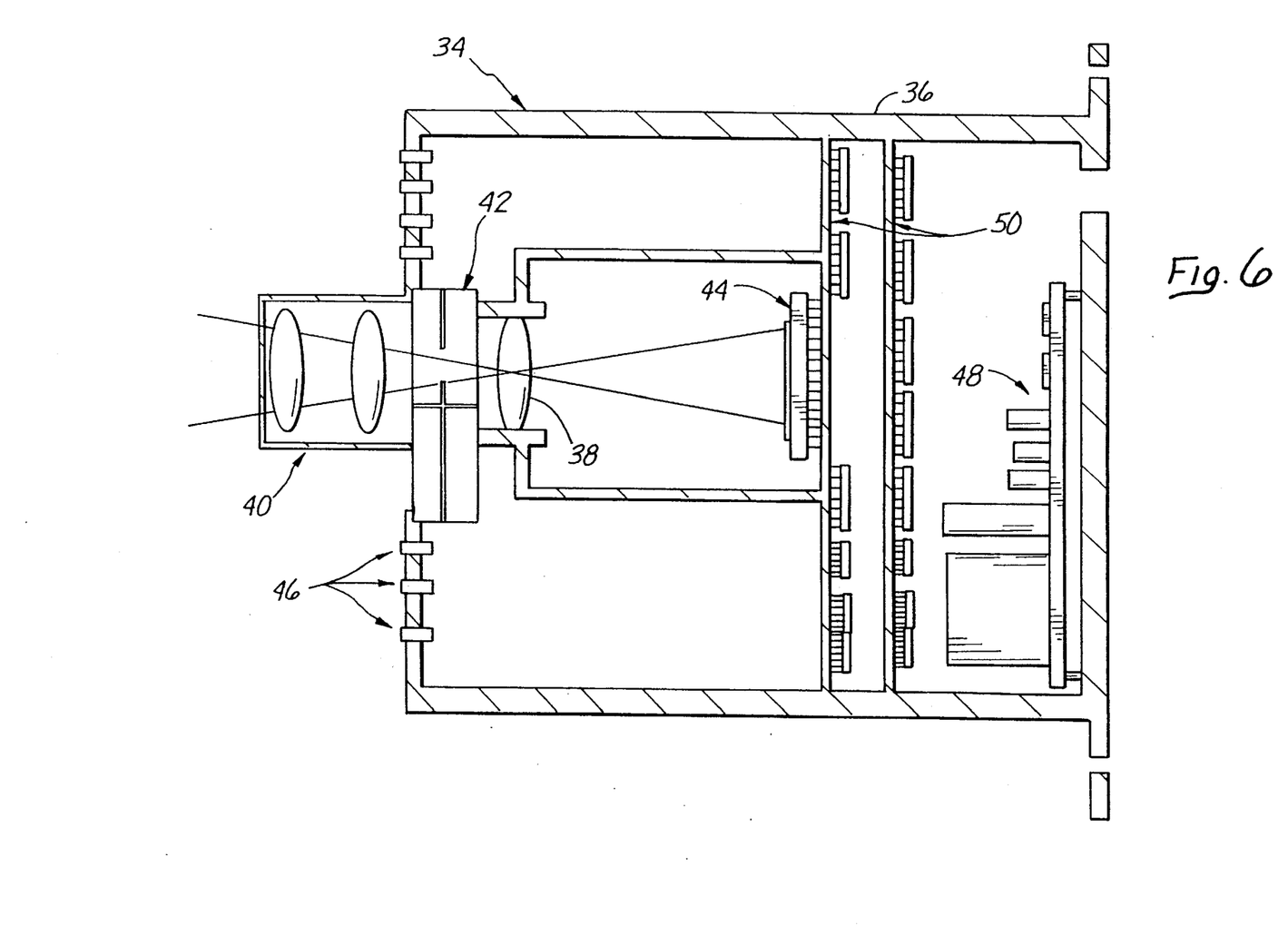
FIG. 6 is a diagrammatic representation of the video-radiometer/processor unit of the system of the invention.

The system also preferably includes a video camera 34 which is preferably modified to eliminate automatic gain control functions so that the camera composite video signal and iris settings, etc. are not changed as the light is turned on and off. The video camera 34 thus generally functions as a video-radiometer. The video camera or video-radiometer 34 is mounted preferably on the first aircraft 14. The radiometer 34 is preferably positioned so that it can receive light reflected from the mirror 26 and light reflected from the first and second sets of retroreflectors (or light sources) 22 and 24. Thus, the video-radiometer 34 and reflector assembly 18 are oriented so that they generally face each other. The video-radiometer 34 and its components are shown in detail in FIG. 6. The video-radiometer preferably includes a housing 36, a camera or focusing lens 38, a zoom lens subsystem 40, a shutter 42, a CCD image sensor 44, a cable interface (lights for allowing utilization of a mechanization subsystem which is not shown) 46, a power supply 48 and a computer digitizer and data processor boards 50.

The second set of retroreflectors 24 may be either a pair of retroreflectors or a single retroreflector positioned adjacent one of the retroreflectors of the first set 22. This positioning makes the first and second sets of retroreflectors 22 and 24 asymmetrical, as viewed from the video-radiometer 34. Consequently, the roll position of the assembly 18 may be determined simply by radiometric determination of the position of the second set of retroreflectors 24 in the received image.

Figure 4A:
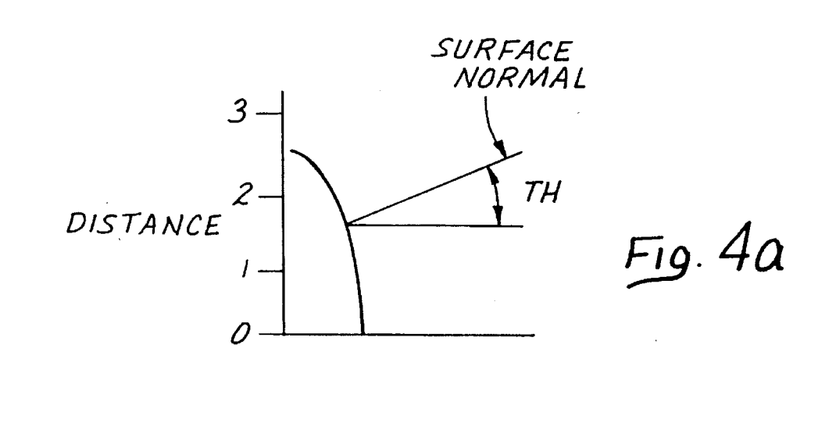
FIG. 4a is a graph showing the relationship between angle of reflection from an ellipsoidal curved surface and distance.
Figure 4B:
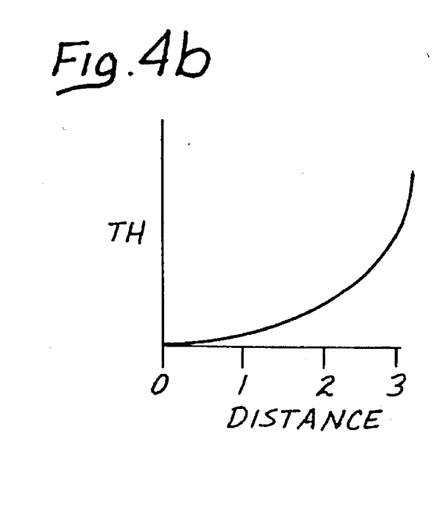
FIG. 4b is another graph also showing the relationship between angle of reflection from an ellipsoidal curved surface and distance.
Figure 4C:
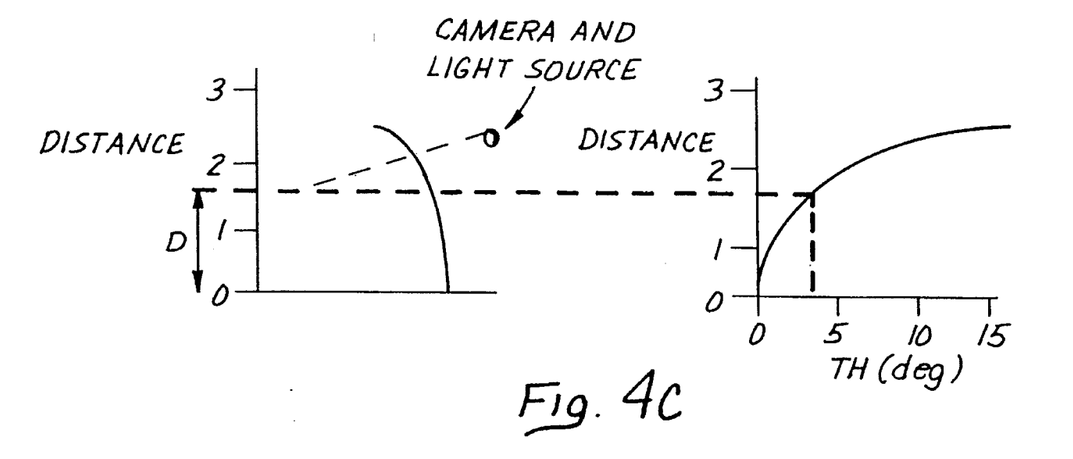
FIG. 4c is a pair of interrelated graphs also showing the relationship between angle of reflection from an ellipsoidal curved surface and distance.

In operation, the video-radiometer's shutter 42 is opened by means of video-radiometer controller 62 to let light from the assembly 18 into the radiometer 34. The lens 38 focuses the light to obtain a focused image on the image sensor 44 which may be a charge coupled device, CCD or other type. The zoom lens 40 controls the field of view to ensure that the image obtained contains the light reflected from the mirror 26 and from the first and second sets of retroreflectors 22 and 24. In addition, the zoom lens 40 preferably ensures that the light image from the assembly 18 generally fills the image sensor's field of view to maximize the number of pixels separating the points of light from the assembly 18 thereby improving the accuracy of measurement of the separation distances. The data relating to the separation and configuration of the points of light focused on the image sensor 44 is transmitted to the computer or data processor boards 50. The computer 50 utilizes the separation data to calculate pitch, yaw and range of the assembly 18 relative to the video-radiometer (or first vehicle 14) by means of trigonometric formulas. The computer utilizes the configuration data i.e., distance from a fixed axis, to calculate bearing and motion of the assembly 18 relative to the video-radiometer 34 (or first vehicle 14) by means of trigonometric formulas. These formulas are derived from the triangular relationships which are established by the particular configuration of the mirror 26 and retroreflectors 22 and 24 of the assembly 18 and the video-radiometer 34 when the assembly 18 (and/or video-radiometer 34) is positioned within a certain range of angular orientations with respect to the video-radiometer 34. Since the curvature of the mirror 26 is a known factor, the particular angle of orientation of the mirror 26 can be computed once the mirror location from which light is reflected is determined. The mirror location can be determined simply by measuring the separation distance between the points of light reflected from the first set of retroreflectors 22 and the point of light reflected from the mirror 26. Since the mirror curved portion 30 is preferably outside the plane of the retroreflectors 22, changing the orientation angle of the reflector assembly 18 so that it is generally turned away from the video-radiometer 34 results in the center of the mirror curved portion 30 moving closer to one of the set of retroreflectors 22 while also moving further away from another opposing one of the set of retroreflectors 22, as viewed from the video-radiometer. Because of this same configuration of the mirror curved portion and set of retroreflectors 22, when the orientation is similarly changed the reflection point on the mirror curved portion 30 also moves closer to one of the set of retroreflectors 22 while moving further away from the opposing one of the set of retroreflectors 22, from the perspective of the video-radiometer 34. The degree to which the reflection location point moves toward and away from the centroids of the retroreflectors 22 depends on the degree and type of curvature of the mirror 26 as well as the distance of the reflection points of the mirror curved portion 30 from the plane 32. FIGS. 4a, 4b and 4c show the angle of the reflected beam as a function of the distance of the mirror location (from which the beam is reflected) from a reference location. FIGS. 4a, 4b and 4c relate to a reflector assembly 18 having a mirror 26 with a generally ellipsoid curvature.

Referring to FIGS. 4a, 4b and 4c:

$$\frac{y^2}{A^2} + \frac{x^2}{B^2} = 1$$

$$THA = \tan^{-1}\left(-\frac{dy}{dx}\right) = \tan^{-1}\left(\frac{Ax}{B(B^2-x^2)^{1/2}}\right)$$

where THA is the angle of the surface normal.

FIGS. 5a and 5b show two additional angles of orientation of the assembly 18 relative to the radiometer 34 and illustrate the triangles formed by connecting the reflection point on the mirror 26 with the reflection points i.e., centroids, on the retroreflectors 22 and with the radiometer 34. FIG. 5a and 5b show the trigonometric relationships for a spheroidal central mirror 26. The trigonometric relationships between the reflection points and the distances between as well as the angles associated therewith allow calculation of the particular angles and particular distances i.e., sides of the triangles, which provide the desired angles of orientation and range of the reflector assembly 18 (and the first vehicle) relative to the radiometer (and the second vehicle). The trigonometric formulas utilized to determine the desired position parameters are as follows:

Referring to FIG. 5a where $c = b \tan(\Theta + \delta)$ and $\beta = \Theta + \delta$ $$\frac{a_1 + c}{\sin\phi_1} = \frac{R}{\sin(90 + \theta - \phi_1 + \delta)} = \frac{R}{\cos(\beta - \phi_2)}$$

$$\frac{a_2 - c}{\sin\phi_2} = \frac{R}{\sin(90 - \beta - \phi_2)} = \frac{R}{\cos(\beta + \phi_2)}$$

$$R = \frac{(a_2 - c)\cos(\beta + \phi_2)}{\sin\phi_2} = \frac{(a_1 + c)\cos(\beta - \phi_2)}{\sin\phi_1}$$

$$\tan\beta = \frac{a_2 \cot\phi_2 - a_1 \cot\phi_1}{a_1 + a_2 + b(\cot\phi_1 + \cot\phi_2)}$$

$$\tan\beta = \frac{a_2 \tan\phi_1 - a_1 \tan\phi_2}{(a_1 + a_2)\tan\phi_1 \tan\phi_2 + b(\tan\phi_1 + \tan\phi_2)}$$

$$\tan\delta = \frac{a_2 \cos(\beta + \phi_2)\sin\phi_1 - a_1 \cos(\beta - \phi_1)\sin\phi_2}{a_2 \cos(\beta + \phi_2)\cos\phi_2 + a_1 \cos(\beta - \phi_1)\cos\phi_2}$$

$$r = \frac{a_1 \cos(\beta - \phi_1)}{\sin(\phi_1 - \delta)}$$

Referring to FIG. 5b:

$$\tan\alpha = \frac{r \sin\phi}{d + r \cos\theta}$$

$$\beta = w_I - \delta - [180 - \alpha - (180 - \theta)]$$

$$\beta = w_I - \delta + \alpha - \theta$$

$$R = \frac{(d + r \cos\theta)}{\cos\alpha}$$

Figure 7:
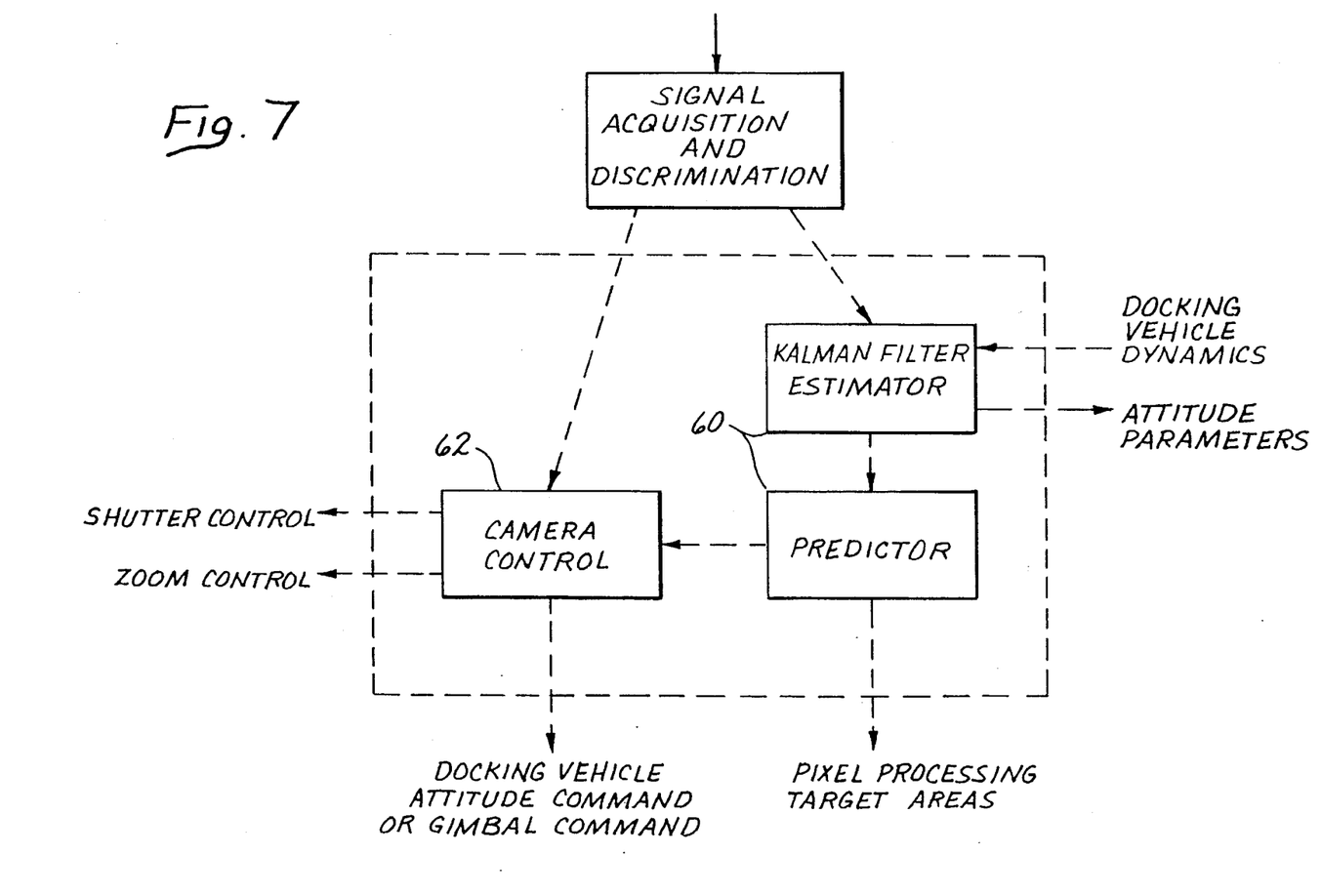
FIG. 7 is a block diagram of the signal processing function of the system of the invention.
Figure 8:
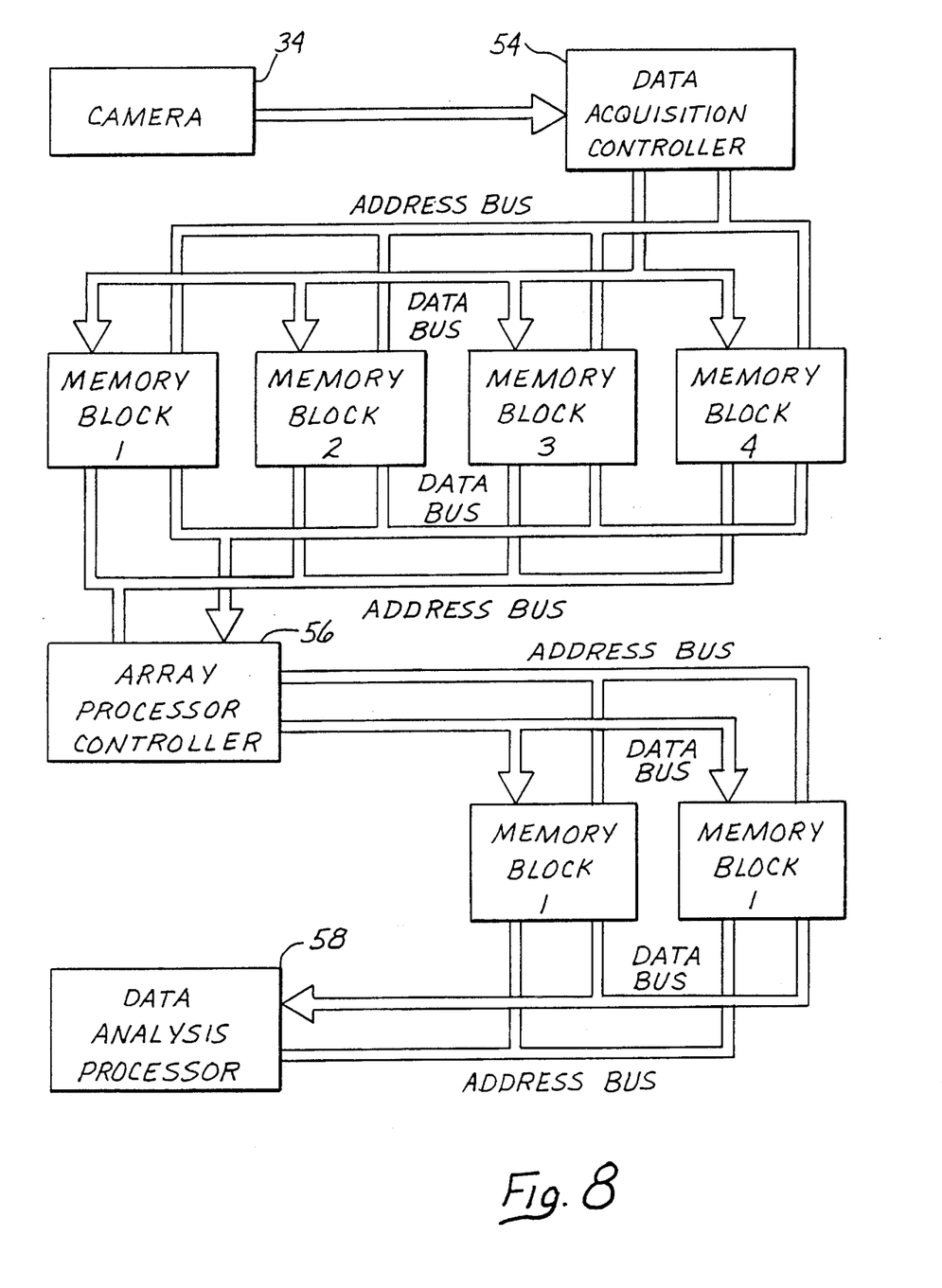
FIG. 8 is a block diagram of the computer memory configuration and data flow of the system of the invention.
Figure 9:
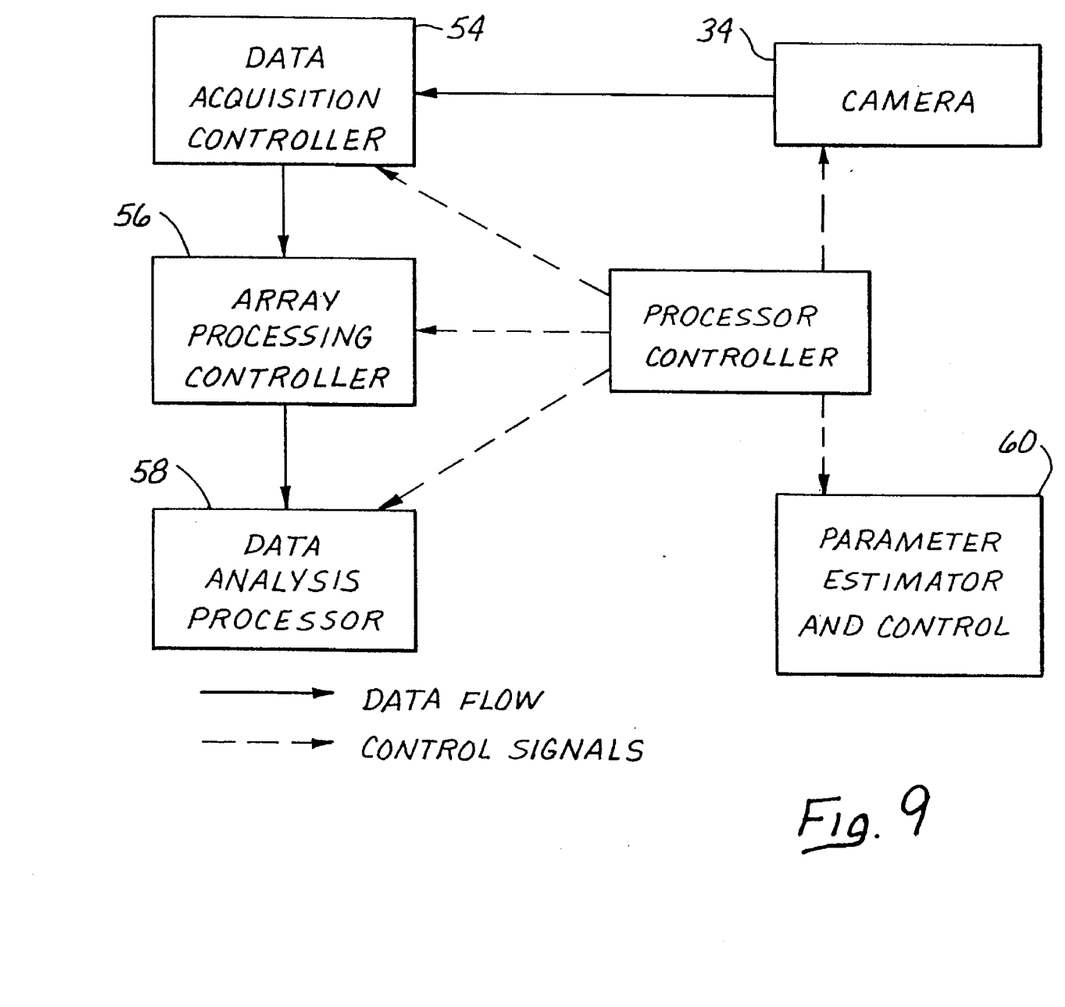
FIG. 9 is a block diagram of the data processing subsystem of the system of the invention.

The computer or data processor boards 50 are preferably integral with the video-radiometer 34. However, computer 50 may alternatively be separate from the video-radiometer 34 and communicatingly connected thereto. The computer 50 preferably includes a data acquisition controller 54, an array processor controller 56, a data analysis processor 58 and a parameter estimator and control 60 (see FIG. 7). The computer data acquisition controller 54 receives the data from the sensor 44 which has taken the image data and has shifted it in the registers of the sensor array 44. The data acquisition controller 54 takes the data from the registers, digitizes it and stores it in designated memory banks. The array processor controller 56 takes data from one memory bank, processes the data and stores it into an analysis memory bank. The controller 56 subtracts the background image from the light data image on a pixel by pixel basis thus eliminating extraneous glare or other light sources. The data analysis processor 58 subsequently takes a processed image out of memory and selects target points which are processed to obtain the desired signal information. The parameter estimator and control 60 subsequently calculates the attitude, bearing and range of the assembly 18 and uses Kalman filters on the raw measurement data to get the best estimate of the vehicle state. The vehicle state information is transmitted to the computer monitor 52 for display and also to the video-radiometer controller 62 to determine the required radiometer attitude angle, radiometer zoom position and array processing regions. The parameter estimator and control 60 is shown in FIG. 9, and the data flow through the computer 50 and the memory configuration thereof is shown in FIG. 8. The particular computer memory configuration and data flow illustrated in FIG. 8 provides high data rate processing for enhanced accuracy.

Figure 10:
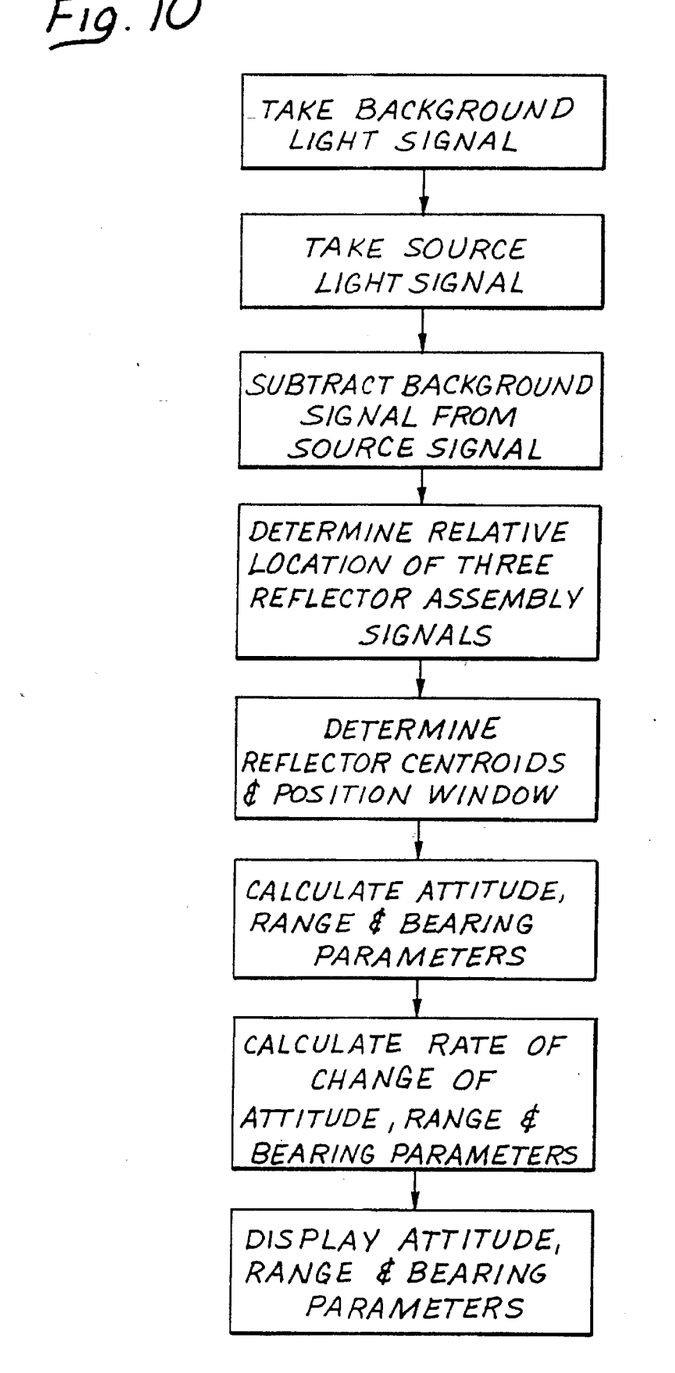
FIG. 10 is a flow chart showing the functional operation of the computer as per the software program of the system of the invention.

FIG. 10 is a flow chart showing the functional operation of the computer 50 under the software program of the system of the invention. Initially, the software program, after receiving the proper commands from the operator, obtains data to be used for acquisition of the target reflector signal. The software program commands the data acquisition controller 54 to take an image with no light on (background image). Subsequently, the light source 12 is turned on and a second image is taken. The background image is subtracted from the signal image. The program detects the three signals in the reflector acquisition data by measuring the signal strengths and determining the three largest signals that are separated by some distance. The logic compares the signal strengths to certain values and finds which of the three signals is the left most signal, the center signal and the right most signal and stores the signal locations in memory. The program calculates the mean signal strengths and utilizes the results to calculate the centroids of the retroreflectors 22 and 24. The signal characteristics are all calculated, and the centroids are used to calculate the position of the window around the signals. The program subsequently takes the centroid data and calculates the bearing, attitude and range of the reflector target. The program filters the calculations and by taking more data and making more calculations over a period of time calculates the rate of change of these parameters i.e., motion of the reflector assembly 18 and thereby the spacecraft 14 relative to the spacecraft 20. These calculated parameters of position and motion are subsequently transmitted to the computer monitor 52 for display.

Alternatively, a plurality of light sources may be utilized instead of a single light source 12. The lights may be turned on one at a time. This type of reflector assembly increases the number of data points thereby providing a higher degree of accuracy to the system.

Accordingly, there has been provided, in accordance with the invention, an attitude, bearing, range and rate measuring system utilizing a digital image radiometer that fully satisfies the objectives set forth above. It is to be understood that all terms used herein are descriptive rather than limiting. Although the invention has been specifically described with regard to spacecraft docking, the invention may also be used to monitor movement of objects due to forces, environmental conditions, etc. and for precise positioning of objects for accurate machining, fitting, assembly, etc. In addition, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

What is claimed is:

1. A system for determining relative position and relative motion of a plurality of in flight vehicles, comprising:

a light assembly mounted on a first vehicle of the plurality of vehicles, said light assembly including a plurality of light sources, said light assembly including a reflector, said plurality of light sources including a first set of light sources mounted at the periphery of said reflector and a second set of light sources mounted at the periphery of said reflector;

a light source mounted on a second vehicle of said plurality of vehicles for illuminating said reflector;

a light source control means electrically connected to said light source for activation and deactivation thereof;

a video-radiometer mounted on said second vehicle, said video-radiometer receiving light from said assembly, said video-radiometer discerning light emitted from each of said plurality of light sources, said video-radiometer having an electrical output which includes data relating to light received from said assembly;

a computer for receiving the electrical output including the data, said computer operatively connected to said light source control for allowing said video-radiometer to selectively receive light originating from extraneous sources and light originating from both said light assembly and from extraneous sources, said computer having a software program which utilizes the electrical output data to calculate position and motion parameters of the vehicles;

a display means electrically connected to said computer for receiving electrical output therefrom for displaying the position and motion parameters in order to facilitate link up or docking of the vehicles.

2. The system of claim 1 wherein said first set of light sources generally lie in a plane generally facing said video-radiometer in order to direct light thereto, said reflector lying at least partly outside the plane in order to allow calculation of pitch, yaw, bearing and motion parameters or the first vehicle relative to the second vehicle.

3. The system of claim 1 wherein said plurality of light sources emit light in radial directions to enable said video-radiometer to receive light from said plurality of light sources within a desired range of orientations of said light assembly relative to said video-radiometer.

4. The system of claim 1 wherein said computer includes software which converts the data from said video-radiometer into digital form and stores the digitized data in computer memory.

5. The system of claim 4 wherein said software utilizes the digitized data to calculate pitch, yaw, bearing and motion parameters of the first vehicle relative to the second vehicle based on trigonometric relationships between locations of said light sources, reflection points of said reflector and said video-radiometer where light from said light sources and said reflector are received.

6. The system of claim 1 wherein said computer includes an array processor controller for receiving image data relating to the light originating from said light assembly and from extraneous sources from said video-radiometer and for receiving image data relating to the light originating from extraneous sources from said video-radiometer and for subtracting the image data relating to the light originating from said light assembly and from extraneous sources from the image data relating to the light originating from extraneous sources in order to isolate the light from the light sources from extraneous light and thereby generally eliminate undesired light signals from the image data used to determine the relative position and motion of the vehicles.

7. The system of claim 1 wherein said video-radiometer includes video camera means constructed such that the received light falls within the dynamic range of the video camera means without use of any automatic gain control means for video camera means.

8. The system of claim 6 wherein the software program in response to operator input commands the computer to take an image without said light source illuminating said reflector and to take an image with said light source illuminating said reflector, the program acquires background light signal and source light signal from the data relating to light received from said assembly, the program subtracts the background signal from the source signal and utilizes the result to determine relative location of three reflector assembly signals, the program utilizes the relative location of the three reflector assembly signals to determine reflector assembly centroids and position window, the program utilizes the reflector assembly centroids and position window to calculate attitude, range and bearing parameters and rate of change of attitude, range and bearing parameters and the rate of change of attitude, range and bearing parameters to said display means.

9. A system for determining relative position and relative motion of a plurality of in-flight vehicles, comprising:

a reflector assembly mounted on a first vehicle of said plurality of vehicles, said reflector assembly including a reflector and a plurality of retroreflectors, said plurality of retroreflectors including a first set of retroreflectors mounted at the periphery of said reflector, each of said first set of retroreflectors being spaced from each other, and a second set of retroreflectors mounted at the periphery of said reflector, said second set of retroreflectors being in general alignment with one of said first set of retroreflectors, and one of said second set of retroreflectors being generally proximal to said one of said first set of retroreflectors relative to spacing between said each of said first set of retroreflectors, so that said plurality of retroreflectors are adapted for accurately determining relative roll position parameters and roll motion parameters of the vehicles;

a source of electromagnetic radiation mounted on a second vehicle of said plurality of vehicles, said source directing radiation at said assembly for the illumination thereof;

a video camera mounted on said second vehicle, said video camera receiving radiation reflected from said assembly and having an electrical output which includes data relating to radiation reflected from said assembly;

a computer for receiving the electrical output including the data, said computer having a software program which utilizes the electrical output data to calculate position and motion parameters of the vehicles; and further including an array processor controller for receiving image data relating to the electromagnetic radiation originating from said reflector assembly and from extraneous sources from said video camera and image data relating to electromagnetic radiation originating from extraneous sources from said video camera and for subtracting the image data relating to the electromagnetic radiation originating from said reflector assembly and from the extraneous sources from the image data relating to the electromagnetic radiation originating from the extraneous sources in order to isolate the electromagnetic radiation from the electromagnetic radiation sources from electromagnetic radiation from extraneous sources and thereby generally eliminate undesired electromagnetic radiation signals from the image data used to determine the relative position and motion of the vehicles; and a computer monitor electrically connected to said computer for displaying the position and motion parameters in order to facilitate link up or docking of the vehicles.

10. A system for determining relative position and relative motion of a plurality of in-flight vehicles, comprising:

a reflector assembly mounted on a first vehicle of said plurality of vehicles, said reflector assembly including a reflector and a plurality of retroreflectors, said plurality of retroreflectors including a first set of retroreflectors mounted at the periphery of said reflector, each of said first set of retroreflectors being spaced from each other, and a second set of retroreflectors mounted at the periphery of said reflector, said second set of retroreflectors being in general alignment with one of said first set of retroreflectors, and one of said second set of retroreflectors is radially adjacent to said one of said first set of retroreflectors so that said plurality of retroreflectors are adapted for accurately determining relative roll position parameters and roll motion parameters of the vehicles;

a source of electromagnetic radiation mounted on a second vehicle of said plurality of vehicles, said source directing radiation at said assembly for the illumination thereof;

a source control means electrically connected to said source of electromagnetic radiation for activation and deactivation thereof and electrically connected to said computer for computer operation of said source control means for controlling radiation emission from said source in order to allow said video camera to selectively receive source radiation reflected from said assembly and to selectively receive extraneous radiation reflected from said assembly in order to isolate the reflected source radiation from reflected extraneous radiation;

a video camera mounted on said second vehicle, said video camera receiving radiation reflected from said assembly and having an electrical output which includes data relating to radiation reflected from said assembly;

a computer for receiving the electrical output including the data, said computer having a software program which utilizes the electrical output data to calculate position and motion parameters of the vehicles; and a computer monitor electrically connected to said computer for displaying the position and motion parameters in order to facilitate link up or docking of the vehicles.

* * * * *